(12) United States Patent
Denaro

(10) Patent No.: US 8,134,478 B2
(45) Date of Patent: Mar. 13, 2012

(54) DATA MINING IN A DIGITAL MAP DATABASE TO IDENTIFY COMMUNITY REPORTED DRIVING HAZARDS ALONG ROADS AND ENABLING PRECAUTIONARY ACTIONS IN A VEHICLE

(75) Inventor: Robert Denaro, Long Grove, IL (US)

(73) Assignee: Navteq B.V., Veldhoven (NL)

( * ) Notice: Subject to any disclaimer, the term of this patent is extended or adjusted under 35 U.S.C. 154(b) by 524 days.

(21) Appl. No.: 12/156,270

(22) Filed: May 30, 2008

(65) Prior Publication Data
US 2009/0300035 A1 Dec. 3, 2009

(51) Int. Cl.
*G08G 1/09* (2006.01)

(52) U.S. Cl. .......... 340/905; 340/425.5; 340/471; 340/901; 340/988; 701/200; 707/661; 707/706; 707/736; 707/758

(58) Field of Classification Search ............ None
See application file for complete search history.

(56) References Cited

U.S. PATENT DOCUMENTS

| | | | | |
|---|---|---|---|---|
| 5,164,904 A * | 11/1992 | Sumner | ............ | 701/117 |
| 5,539,645 A * | 7/1996 | Mandhyan et al. | ............ | 701/119 |
| 5,815,802 A * | 9/1998 | Loechner, II | ............ | 455/414.1 |
| 5,933,100 A * | 8/1999 | Golding | ............ | 340/995.13 |
| 6,150,961 A * | 11/2000 | Alewine et al. | ............ | 340/995.1 |
| 6,173,231 B1 * | 1/2001 | Chojnacki | ............ | 701/208 |
| 6,204,778 B1 * | 3/2001 | Bergan et al. | ............ | 340/936 |
| 6,351,709 B2 * | 2/2002 | King et al. | ............ | 701/210 |
| 6,363,325 B1 * | 3/2002 | Bates et al. | ............ | 701/301 |
| 6,466,862 B1 * | 10/2002 | DeKock et al. | ............ | 701/117 |
| 6,480,783 B1 * | 11/2002 | Myr | ............ | 701/117 |
| 6,498,976 B1 * | 12/2002 | Ehlbeck et al. | ............ | 701/70 |
| 6,650,252 B2 * | 11/2003 | Miller, Jr. | ............ | 340/989 |
| 6,714,894 B1 * | 3/2004 | Tobey et al. | ............ | 702/188 |
| 6,856,902 B1 | 2/2005 | Mitchem | ............ | 701/213 |
| 7,283,045 B1 * | 10/2007 | Manz | ............ | 340/506 |
| 7,427,929 B2 * | 9/2008 | Bauer et al. | ............ | 340/905 |
| 7,711,475 B1 * | 5/2010 | Cona et al. | ............ | 701/202 |
| 7,986,247 B2 * | 7/2011 | Bauer et al. | ............ | 340/905 |
| 2008/0077309 A1 * | 3/2008 | Cobbold | ............ | 701/117 |
| 2008/0215238 A1 | 9/2008 | Geelen et al. | ............ | 701/210 |
| 2009/0105901 A1 * | 4/2009 | Haller et al. | ............ | 701/33 |

* cited by examiner

*Primary Examiner* — Hung Le
(74) *Attorney, Agent, or Firm* — Frank J. Kozak; Jon D. Shutter; Adil M. Musabji

(57) ABSTRACT

Disclosed is a feature for a vehicle that enables taking precautionary actions in response to conditions on the road network around or ahead of the vehicle. User reports of hazardous conditions along roads are obtained and analyzed to identify reports that pertain to the same general location along a road network. A database that represents the road network is used to confirm the user reports, identify the hazardous condition, and determine locations where precautionary action may be taken. Then, precautionary action data is added to the database to indicate a location at which a precautionary action is to be taken about the user-reported hazardous condition located along the section of road. A precautionary action system installed in a vehicle uses this database, or a database derived therefrom, in combination with a positioning system to determine when the vehicle is at a location that corresponds to the location of a precautionary action. When the vehicle is at such a location, a precautionary action is taken by a vehicle system as the vehicle is approaching a user-reported hazardous condition.

19 Claims, 5 Drawing Sheets

DATA MINING IN A DIGITAL MAP DATABASE TO IDENTIFY COMMUNITY REPORTED DRIVING HAZARDS ALONG ROADS AND ENABLING PRECAUTIONARY ACTIONS IN A VEHICLE

REFERENCE TO RELATED APPLICATION

The present patent application is related to the copending patent application Ser. No. 12/156,264, filed on the same date, entitled "DATA MINING TO IDENTIFY LOCATIONS OF POTENTIALLY HAZARDOUS CONDITIONS FOR VEHICLE OPERATION AND USE THEREOF," the entire disclosure of which is incorporated by reference herein.

BACKGROUND OF THE INVENTION

The present invention relates to a method and system that enables taking a precautionary action in a vehicle, such as providing a warning to a vehicle driver about a potentially difficult or hazardous driving condition on the road network.

Advanced driver assistance systems ("ADAS"), including active safety and fuel economy systems, have been developed to improve the comfort, efficiency, safety, and overall satisfaction of driving. Examples of these advanced driver assistance systems include adaptive headlight aiming, adaptive cruise control, lane departure warning and control, curve warning, speed limit notification, hazard warning, predictive cruise control, and adaptive shift control, as well as others. Some of these advanced driver assistance systems use a variety of sensor mechanisms in the vehicle to determine the current state of the vehicle and the current state of the roadway in front of the vehicle. These sensor mechanisms may include radar, infrared, ultrasonic and vision-oriented sensors, such as digital video cameras and lidar. Some advanced driver assistance systems also use digital map data. Digital map data can be used in advanced driver assistance systems to provide information about the road network, road geometry, road conditions and other items associated with the road and terrain around the vehicle. Digital map data is not affected by environmental conditions, such as fog, rain or snow. In addition, digital map data can provide useful information that cannot reliably be provided by cameras or radar, such as curvature, grade, bank, speed limits that are not indicated by signage, traffic and lane restrictions, etc. Further, digital map data can provide a predictive capability well beyond the range of other sensors or even beyond the driver's vision to determine the road ahead of the vehicle, around corners, over hills or beyond obstructions. Accordingly, digital map data can be a useful addition for some advanced driver assistance systems.

Although these kinds of systems provide useful features, there exists room for further improvements. For example, it would be useful to identify locations on the road network where a relatively high number of traffic accidents have occurred (so called "black spots"). However, statistics pertaining to accidents are maintained by various different administrative entities that use different formats, standards, reporting methods, reporting periods, etc. Accordingly, it is difficult to obtain consistent information about traffic accidents on roads in a large geographic region, such as the entire United States or Europe. Moreover, data indicating locations where a statistically large number of traffic accidents occur may not indicate the causes of the accidents or how accidents can be avoided.

Accordingly, it is an objective to provide a system that facilitates taking a precautionary action in a vehicle, such as providing as warning to a vehicle operator, when approaching a location were a significant number of accidents has occurred.

SUMMARY OF THE INVENTION

To address these and other objectives, the present invention comprises a feature that enables taking a precautionary action in a vehicle as the vehicle approaches a location known or reported by members of the public where a significant number of accidents have occurred or where a hazardous driving condition exists. The precautionary action may be a warning message provided to the vehicle driver to alert the vehicle driver about the location known to be where a hazardous condition exists so that the vehicle driver can pay extra attention. Alternatively, the precautionary action may be an actual modification of the operation or control of the vehicle, such as braking, accelerating, or maneuvering the vehicle, or activating a sensor. Alternatively, the precautionary action may be providing an input to an algorithm that also processes inputs from other sensors for taking such actions. In another alternative, the precautionary action may include a combination of any of these aforementioned actions.

According to another aspect, a database that represents the road network is used to analyze reports from members of the public about locations where a significant number of accidents has occurred. Then, precautionary action data is added to the database to indicate a location at which a precautionary action is to be taken about the known hazardous location.

According to further aspects, a precautionary action system installed in a vehicle uses this database, or a database derived therefrom, in combination with a positioning system, to determine when the vehicle is at a location that corresponds to the location where a precautionary action should be taken. When the vehicle is at such a location, the precautionary action is taken, such as providing a warning to the vehicle operator. Alternatively, the precautionary action may consist of an actual modification of the operation or control of the vehicle, such as braking, accelerating, or maneuvering the vehicle, or activating a sensor. Alternatively, the precautionary action may include providing an input to an algorithm that also processes inputs from other sensors for taking such actions. Alternatively, the precautionary action may be an adjustment of sensitivities of other ADAS applications such as increasing the control authority and sensitivity of a lane departure warning or control system to lane edge approach and violation. In another alternative, the precautionary action may include a combination of any of these aforementioned actions.

DETAILED DESCRIPTION OF THE DESCRIPTION OF THE PRESENTLY PREFERRED EMBODIMENTS

Figure 1:
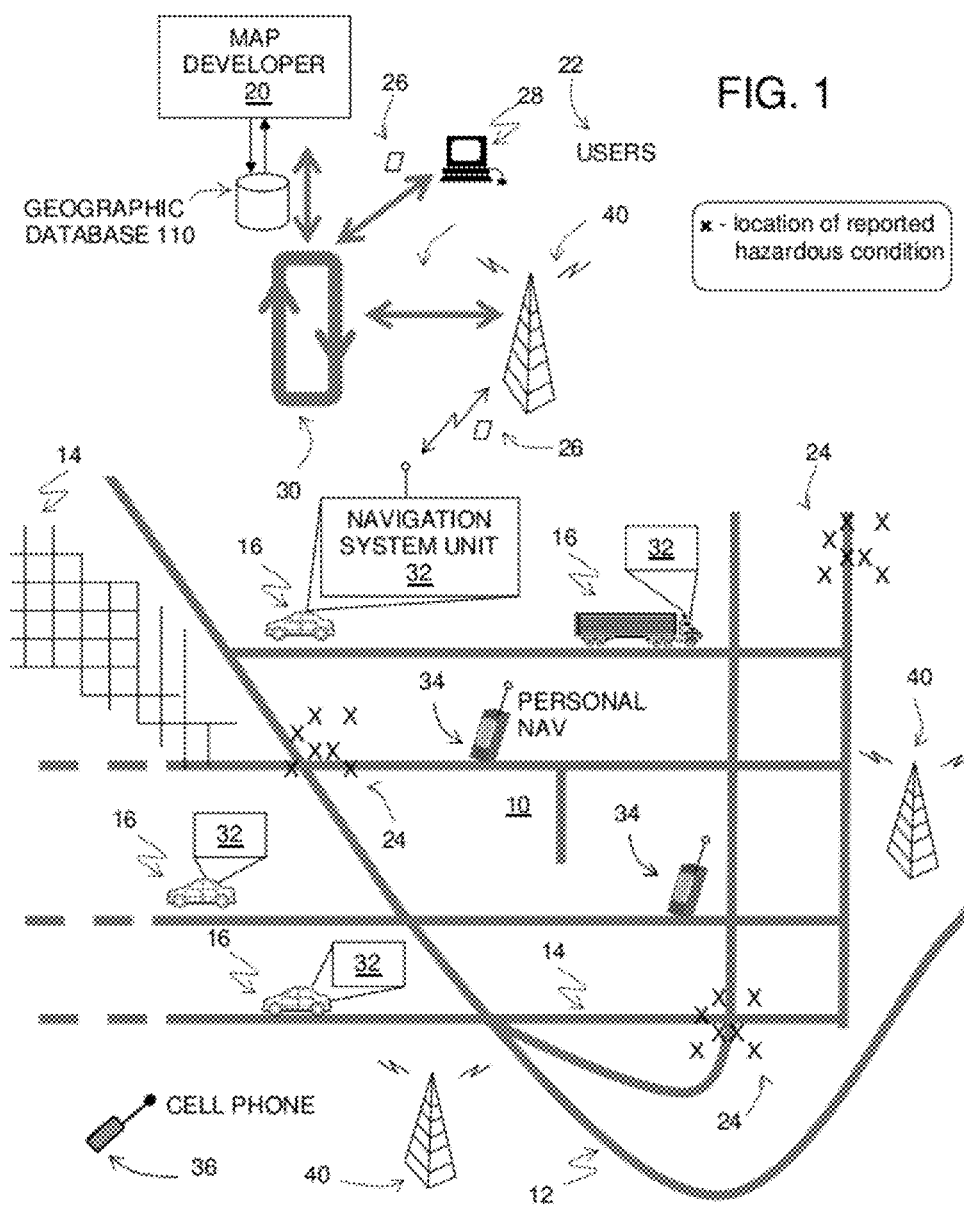
FIG. 1 is an illustration of a system for obtaining user feedback about locations of known hazardous conditions throughout a road network.

FIG. 1 is a diagram illustrating a system for obtaining community input and/or user feedback about potentially hazardous driving locations throughout a road network in a region. FIG. 1 shows a portion 10 of a geographic region. The geographic region may correspond to an entire country, or several countries, a state, province, metropolitan or rural area, a state, a country, or combinations thereof.

Located in the geographic region 10 is a road network. A portion 12 of the road network is shown in FIG. 1. The road network is comprised of various kinds of roads 14 upon which vehicles 16 of various kinds travel.

A map developer 20, such as NAVTEQ Corporation or another entity, collects data that describes the road network. The map developer 20 may be located in the geographic region or elsewhere. The map developer 20 uses the collected data to create one or more databases 110 of information that represents the road network. The map developer 20 distributes databases that represent the road network for use in vehicle navigation systems, Internet map and routing sites, handheld navigation systems, and advanced driver assistance systems, as well as other uses.

The map developer 20 (or an entity operating on behalf of the map developer) collects information from users 22 (also referred to as the "community") about hazardous or difficult locations 24 for vehicle operation (or pedestrian travel) throughout the region. These locations 24 (indicated by the mark "x" in FIG. 1) may be locations along the road network known to users where accidents often occur, where accidents are often narrowly avoided, where there are visual obstructions, where the road geometry is unusual or difficult, or where any other condition exists that may affect vehicle operation or safety. The users located throughout the region may use various different platforms to send messages or reports 26 about these hazardous or potentially hazardous locations to the map developer 20. For example, users may use personal computers 28 connected to a communication network 30, such as the Internet, to send email messages to the map developer 20 identifying hazardous driving locations. Alternatively, the map developer may have a web site at which users may submit reports of locations of potentially hazardous locations. The map developer may provide a graphical map that users can pan and zoom to identify the location. Alternatively, the map developer may provide other ways of identifying the locations, such as by textual descriptive or narrative, or even geographic coordinates. When accepting reports about hazardous locations, the map developer may also accept a description of the cause for the hazardous condition. The web site provided by the map developer 20 to obtain user reports about potentially hazardous driving locations may be similar to the site for obtaining user input about map errors described in U.S. Pat. No. 6,718,258, the entire disclosure of which is incorporated by reference herein.

The map developer 20 may also obtain reports about potentially hazardous locations from users operating mobile platforms throughout the region. The mobile platforms include systems that are capable of communicating reports wirelessly from locations throughout the region using a wireless network 40. Alternatively, the mobile platforms may record a location from an entry made by the operator at the location, then stored for future retrieval and submission to the map developer. Such submission may then be wireless or by any of the aforementioned techniques. Mobile platforms may include navigation systems 32 installed in some of the vehicles 16, personal navigation devices 34, or mobile phones 36. The mobile platforms 32, 34, and 36 use applications, either located locally on the mobile platform or remotely on a remote system, to report about potentially hazardous locations throughout the region. These reports may be made while the users are traveling in the region or may be made while the users are stopped. If the user is at the actual location of the hazardous condition when making a report, a positioning system associated with the user's platform, such as a GPS unit, may be used to obtain the user's position to include in the report. The platforms and applications may be similar to those used for reporting map errors described in U.S. Pat. No. 6,253,151, the entire disclosure of which is incorporated by reference herein.

Figure 2:
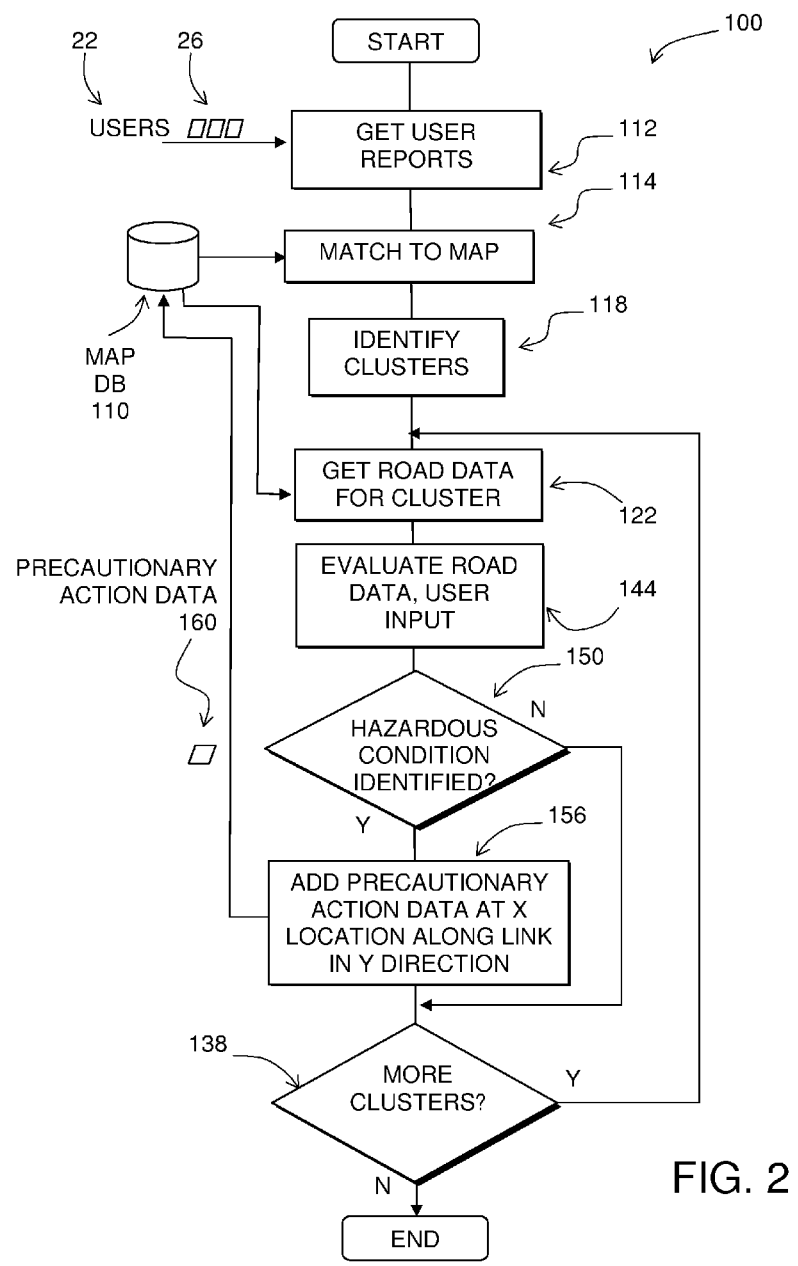
FIG. 2 is a flowchart of a process that uses a database that represents the road network in FIG. 1 to identify locations known by members of the public where a hazardous condition exists.

FIG. 2 is a flowchart of a process 100. The process 100 is performed by a software program or routine that is run on a suitable computing platform, such as a database server, PC or plurality of PCs coupled together for parallel computing applications.

The process 100 uses the database 110 that contains data that represents the road network in a region. The region may be a country, such as the United States, Germany, France or Korea. Alternatively, the region may include several countries or an entire continent. According to another alternative, the region may include only a portion of a country, such as a state or several states or metropolitan areas.

The process 100 is performed by a map developer, such at the map developer 20 in FIG. 1. Alternatively, the process 100 may be performed by another entity that has access to an editable version of a map database 110. For example, the process may be performed by a customer or licensee of the map developer, such as a manufacturer of navigation systems or active safety systems, or by a traffic information services company or by a government office at any level.

The database 110 is in a format that can be edited. That is, new or updated information can be added to the database 110. Alternatively, the database 110 is in a format such that new information can be combined with the original data to form a new database that includes both the original data and new data. In one embodiment, the database is in an Oracle spatial format. Alternatively, the database may be in delivery format, such as GDF (Geographic Data File), SIF (Standard Interchange Format), or other formats, including proprietary formats.

As stated above, the database 110 contains data that represents the road network in the region. The database 110 contains information such as the locations (geographic coordinates, including altitude) of roads and intersections, road names, the three-dimensional shape of the roads including curvature, slope and bank, speed limits along roads, turn restrictions at intersections, addresses or address ranges along roads, the number of lanes each road has, lane width, traffic control features such as stop signs and traffic lights, lane markings, functional classes of roads, the locations of medians, and so on. The database may also contain information about other geographic features, such as bodies of water, parks, administrative areas (including municipal, state and country boundaries), and locations of points of interest, such as businesses, hospitals, police stations, and so on.

In FIG. 2, the process 100 receives the reports 26 sent by the users 22 (Step 112). The information indicating the location of the hazardous condition is extracted from the reports and matched to a digital map of the geographic region (Step 114). Based on this step, the process identifies clusters of reports 26 that pertain to the same proximate geographic location (Step 118). Such clusters may be of arbitrary size subject to the judgment and preferences of the map developer in determining the threshold desired to declare a location as potentially dangerous.

Next, the process 100 obtains data from the map database 110 about the specific portion of the road network to which each cluster pertains (Step 122). Data that describe various represented aspects of the road network in the area of the cluster are obtained. If the reports 26 include information about the kind of hazardous condition that the users believe exists, this information is used to select specific kinds of data from the map database 110. Depending on how the reports 26 specify the kinds of reported hazardous condition, the step of obtaining additional data from the map database 110 may be automated. Alternatively, a human operator may determine appropriate kinds of data to select from the database 110.

The process then evaluates the data obtained from the map database 110 (Step 132). This step attempts to determine or confirm the reported hazardous condition. For example, if the reports 26 indicate that a blind intersection exists, data is obtained from the map database 110 to identify the intersection and the geographic feature(s) that cause a driver's view to be obstructed. If the data obtained from the map database 110 does not confirm the hazardous condition, the process 100 determines whether there are more clusters to evaluate (Steps 150 and 138) and if there are more, the process obtains data to evaluates the next cluster of reports (Step 122, again).

Alternatively, the map developer may not employ a validation and confirmation step if there are a sufficiently large number of reports about a single location. In this case, the location is coded as hazardous based on the volume of reports alone. The map developer may apply other validation criteria such as reports spread over a sufficient period of time.

Referring back to Step 150, if the data obtained from the map database 110 confirms the existence and cause of the reported hazardous condition, precautionary action data 160 is added to the map database (Step 156). The precautionary action data 160 indicates the presence of a feature in the road network where a precautionary action may be taken. After the precautionary action data 160 is added to the database 110, the process 100 proceeds to the step in which it is determined whether all the clusters have been evaluated (Step 138) and if there are more clusters to evaluate, the process 100 proceeds to obtain data to evaluate the next cluster of reports (Step 122).

The process 100 ends when it is determined that all the clusters of reports have been evaluated (Step 138).

It is noted that the process 100, above, performs a data mining function. The existence of the potentially difficult driving location is derived from data already collected and present in the database. It is noted that the process 100, above, evaluates multiple data items in the original database, to determine whether the condition exists. The hazardous condition may be caused by a hill, a curve, a building, landscape, or other geographic feature represented by data in the database. By evaluating these multiple data items, a determination is made whether these multiple data items describe the condition of interest. If these data items do describe the condition, a new data item, i.e., the precautionary action data, is added to the database.

Figure 3:
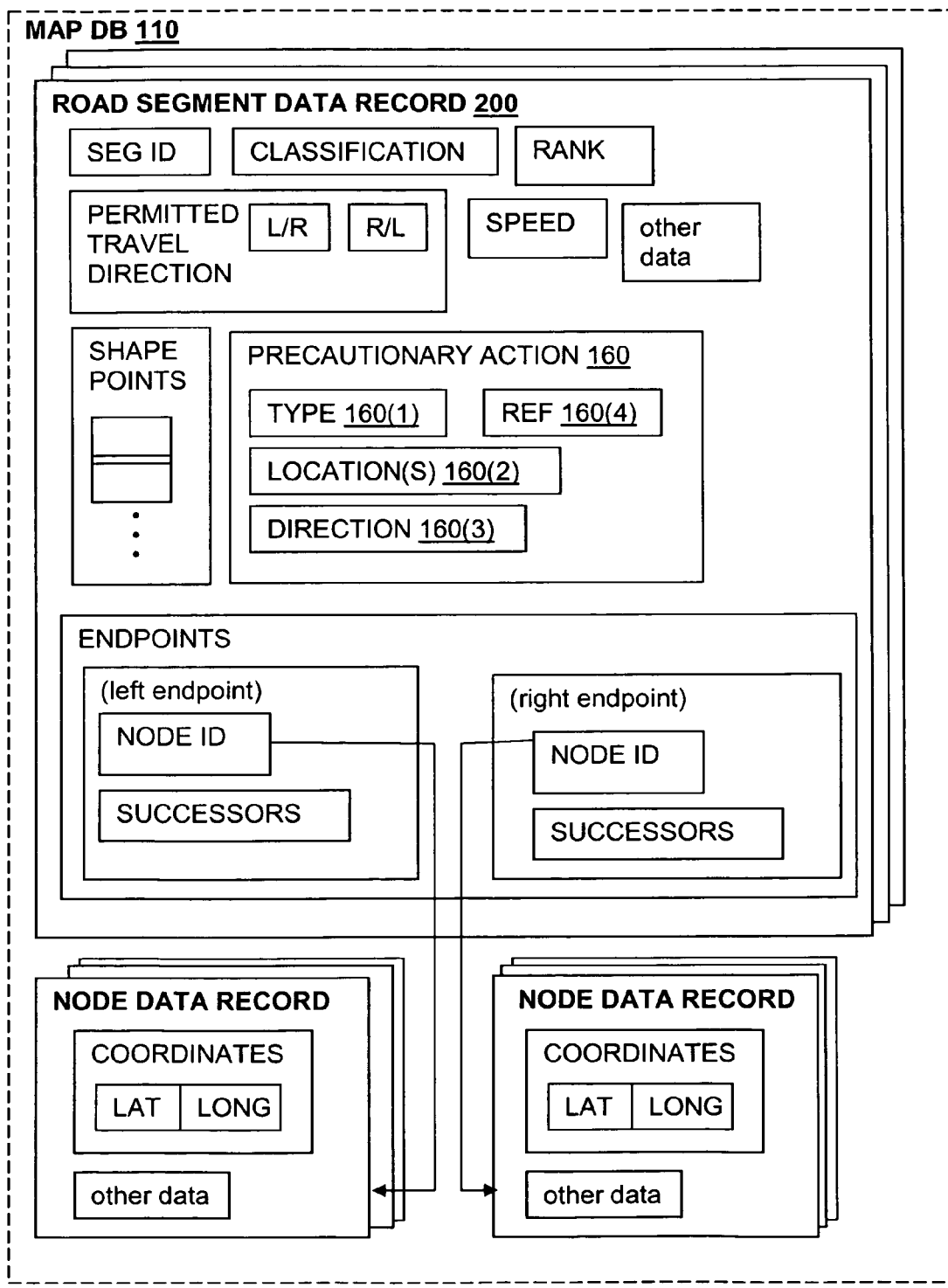
FIG. 3 is a diagram of a data record formed by the process of FIG. 2.

FIG. 3 is a diagram that shows a data record 200 in the database 110. The data record 200 represents a road segment located in a geographic region. As explained above, the geographic region may include an entire country or continent. Accordingly, the database 110 includes many data records like the one shown in FIG. 3.

The data record 200 shown in FIG. 3 is exemplary and shows only one way to represent a road segment. Databases may represent road segments in various different ways and may include different kinds of information. The present invention is not limited to any particular way of representing roads.

Referring to FIG. 3, various data are associated with the data record 200 that represents a road segment. This various data indicates features or attributes of the represented road segment. For example, associated with the data record is data that indicates the permitted direction(s) of travel. Also associated with the road segment record 200 are data that indicate a speed limit, a classification of the road segment (i.e., the type of road, such as controlled access, etc.), a rank (e.g., 1-4), the endpoints of the road segment, shape points (i.e., locations along the road segment between its endpoints). Also associated with the road segment records is data that indicate the successors at each endpoint. Successors are those road segments that connect to the represented road segment at each of its endpoints. The segment record 200 may identify these successors by reference to the data records that represent the successors.

In FIG. 3, the database 110 also includes precautionary action data 160. The precautionary action data 160 is the data added to the database 110 by the process 100 in FIG. 2. In FIG. 3, the precautionary action data 160 is shown as added to the road segment record 200. It should be understood that the process 100 adds precautionary action data 160 with respect to only certain records, i.e., records that represent those roads segments that meet the conditions identified by the process. Accordingly, the database 110 will contain data records that represent road segments that contain the precautionary action data 160 and other data records that represent road segments that do not contain the precautionary action data 160.

In the embodiment shown in FIG. 3, the precautionary action data 160 is associated with the road segment identified as having a user-identified hazardous location. In this embodiment, the precautionary action data 160 includes several components. One component 160(1) indicates a condition type. This condition type 160(1) indicates the type of condition about which a precautionary action is to be taken, which may be a blind intersection, a curve with changing curvature, an intersection at the bottom of a hill, etc. This condition type 160(1) component is used when different conditions are identified in the database 110 about which precautionary action may be taken.

Another component of the precautionary action data 160 is the precautionary action location 160(2). The precautionary action location 160(2) indicates where along the represented road segment a precautionary action may be taken. The precautionary action location 160(2) data may include multiple entries. For example, the precautionary action location 160(2) may indicate where a warning may be provided to a vehicle driver to advise the driver about the upcoming condition. The warning location 160(2) may indicate a distance (e.g., x meters) from the hazardous location. The location 160(2) is determined based on an analysis of factors, such as the slope of the hill (if any), the speed limit along the represented road segment, the road classification, and possibly other factors. These factors may be determined from other data contained in the database 110. According to one example, the location 160(2) may indicate that a warning should be provided at a location 400 meters along the road segment from the user-reported hazardous location.

The precautionary action location 160(2) may also indicate where a vehicle control action should be taken, such as tightening the seatbelts, pre-loading or engaging the brakes, tightening sensitivities of lane departure warning systems or stability control systems, etc. This may be a different location from where the precautionary warning is provided and would be based on a different analysis of factors.

Another component of the precautionary action data 160 is direction data 160(3). The direction data 160(3) indicates the direction along the represented road segment where the precautionary action should be taken. (Note that the database 110 may indicate a direction along a road segment as positive or negative based on the relative latitude and longitude of the road segment endpoints. Accordingly, the direction may be indicated as positive or negative.)

Another component of the precautionary action data 160 is a reference 160(4). In this case, the reference 160(4) indicates the location of the user-reported hazardous condition.

The precautionary action data 160 described in FIG. 3 is one way that this data may be included in a database that represents a geographic region. There are alternative ways to include the precautionary action data. For example, the precautionary action data may be included as separate data records in the database 110. If included as separate data records, the precautionary action data may be associated with the road segments to which they apply by pointers or other suitable data references. Alternatively, the precautionary action data may be associated with node data records, i.e., the data that represent the intersections, instead of the road segments leading to the intersections. Various other ways exist and the present invention is not intended to be restricted to any specific implementation.

Figure 4:
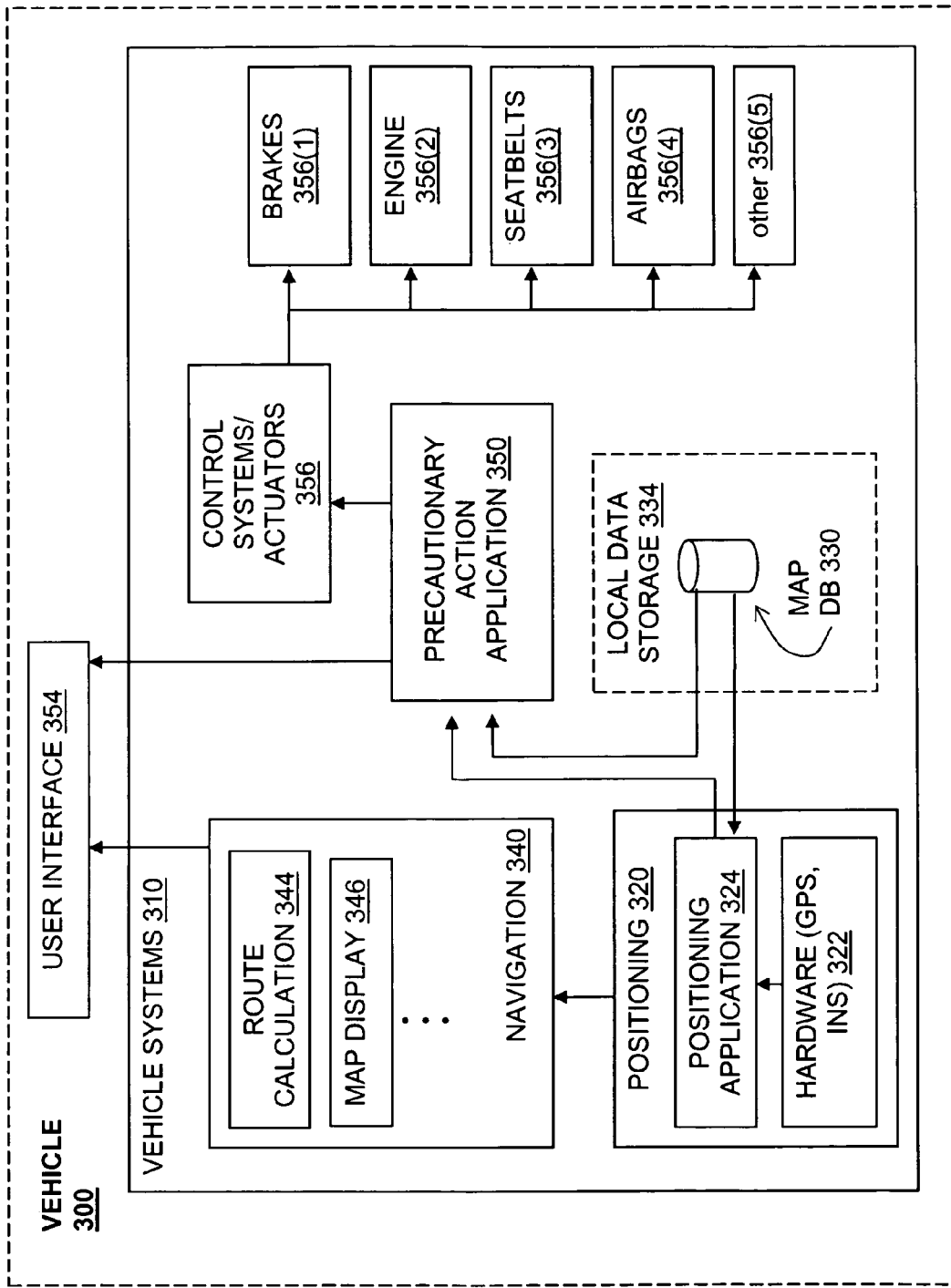
FIG. 4 is a diagram of a vehicle system that uses data produced by the process of FIG. 2.

FIG. 4 is a diagram depicting components of a vehicle 300. The vehicle 300 is operated on a road network, such as the road network represented by the database 110 in FIG. 2. The vehicle 300 may be an automobile, truck, bicycle, motorcycle, etc.

The vehicle 300 includes systems 310. In this embodiment, the vehicle systems 310 include a positioning system 320. The positioning system 320 determines the position of the vehicle 300 on the road network. The positioning system 320 includes appropriate hardware and software to determine the position of the vehicle 300. For example, the positioning system may include hardware 322 that includes a GPS unit, an accelerometer, wheel speed sensors, etc. The positioning system 320 also includes a positioning application 324. The positioning application 324 is a software application that uses outputs from the positioning system hardware 322 and information from a map database 330. The positioning application 324 determines the position of the vehicle 300 with respect to the road network, including the location of the vehicle 300 along a road segment and a direction of travel of the vehicle along the road segment.

In one embodiment, the map database 330 is located in the vehicle. In an alternative embodiment, the map database 330 may be located remotely and accessed by the vehicle systems 310 using a wireless communication system. In yet another embodiment, part of the map database 330 may be located locally in the vehicle and part of the map database 330 may be located remotely.

The map database 330 is stored on a computer readable medium 334. The computer-readable medium may be implemented using any suitable technology. For example, the computer readable medium may be a DVD disk, a CD-ROM disk, a hard disk, flash memory, or any other medium, or a plurality of media.

The map database 330 includes data that represents the geographic region in which the vehicle 300 is being operated. The map database 330 may represent the same geographic region as the database 110 in FIG. 2, or alternatively, the map database 330 may represent only a portion of the region represented by the database 110.

The map database 330 used by the vehicle systems 310 may be in a different format from the database 110 in FIG. 2. The map database 330 is formed or derived from the database 110 by a compilation process that organizes and presents the data in a form and format that specifically facilitates its use for performing specific functions. For example, the map database 330 may be separated into different collections of data that are used for specific functions, such as vehicle positioning, route calculation, map display, route guidance, destination selection, and so on. The map database 330 may also be organized into groupings spatially. One kind of compiled database format is disclosed in U.S. Pat. No. 5,968,109, entire disclosure of which is incorporated by reference herein. Various other compiled database formats exist, including proprietary formats, and the disclosed embodiment(s) are not limited to any particular format.

Included among the vehicle systems 310 in FIG. 4 is a navigation system 340. The navigation system 340 uses outputs from the positioning system 320 and data from the map database 330 to provide navigation-related features to a vehicle user, e.g., the vehicle operator or passenger. The navigation system 340 includes applications for route calculation 344, map display 346, as well as possibly other applications. The navigation system 340 provides the navigation-related features to the vehicle user via a user interface 354. (The navigation system 340 is optional and may be omitted.)

Also included among the vehicle systems 310 is a precautionary action application 350. The precautionary action application 350 uses outputs from the positioning system 320 and data from the map database 330 to take precautionary actions, such as provide warnings to the vehicle operator. The precautionary action application 350 provides the warning to the vehicle operator via the user interface 354.

FIG. 4 also shows that precautionary action application 350 provides an output to vehicle control systems and actuator 356. The vehicle control systems and actuator are operatively connected to various vehicle mechanical systems, such as the vehicle's brakes 356(1), engine 356(2), seatbelts (including tensioners) 356(3), airbags 356(4), stability control algorithms, as well as other system systems 356(5).

Figure 5:
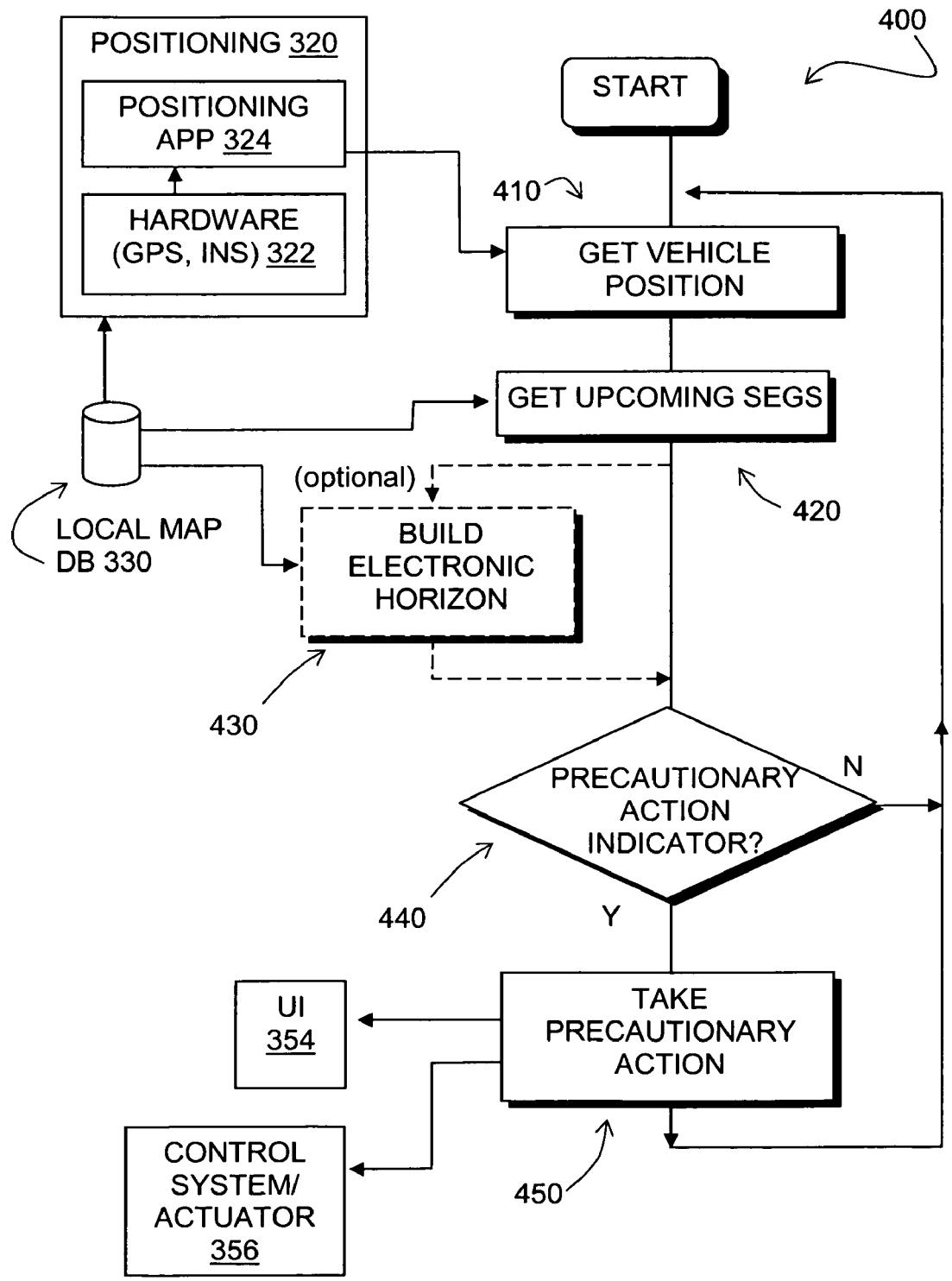
FIG. 5 is a flowchart of a process performed by the system of FIG. 4.

FIG. 5 is a flowchart 400 showing operation of the precautionary action application 350 (in FIG. 4). As the vehicle 300 (in FIG. 4) is being operated on a road, the precautionary action application 350 obtains the current vehicle position from the positioning system 320 (Step 410). (During vehicle operation, the positioning system 320 continuously determines the current geographic position of the vehicle 300 as the vehicle is being operated using data from the map database 330.) The positioning system 320 provides the precautionary action application with data that indicates the current vehicle position with respect to the road network as represented by the map database 330. Specifically, the location of the vehicle along a road segment and the direction of travel of the vehicle along the road segment are determined and provided to the precautionary action application 350.

Next, the process 400 obtains data from the map database 300 that represents the geographic features (i.e., roads, intersections, etc.) at the current location of the vehicle and in the direction in which the vehicle is heading (Step 420). In one embodiment, an electronic horizon is used (Step 430). Building an electronic horizon and using it to provide warnings are disclosed in U.S. Pat. Nos. 6,405,128 and 6,735,515 and U.S. patent application Ser. No. 11/400,151, the entire disclosures of which are incorporated by reference herein. Using an electronic horizon and/or the inventions disclosed in these patents and pending patent application is optional and the disclosed process 400 is not limited to using the electronic horizon technology.

After obtaining data from the map database 300 that represents the geographic features at the current location of the vehicle and in the direction in which the vehicle is heading, the process 400 includes the step of examining the data to determine whether any precautionary action data (160 in FIG. 3) is associated with the represented geographic features (Step 440). If there is no precautionary action data associated with the represented geographic features, the process 400 loops back to get a new current vehicle position (Step 410). On the other hand, if there is precautionary action data associated with the represented geographic features, the process 400 takes a precautionary action (Step 450). The precautionary action may be a warning provided to the vehicle operator when the vehicle is at the location (i.e., 160(2) in FIG. 3) indicated by the precautionary action data. The warning may be provided via the user interface 354. The warning may be an audible warning message or a visual warning.

The precautionary action is not limited to warnings, but may also include other actions. For example, vehicle systems 356, such as the brakes, engine or transmission, can be readied for a quick deceleration or stop. In addition, the seatbelts may be tightened or the airbags set to deploy. As explained above, to facilitate these kinds of actions, additional information may be added to the warning data 160 (in FIG. 3) to indicate the type of action as well as the location where the action should be taken.

Referring still to FIG. 5, after taking the precautionary action, the process 400 loops back to get a new current vehicle position (Step 410).

Alternative with Dynamic Data

The process (400 in FIG. 5) was described as a way to use the precautionary action data that had been stored in the map database to take an appropriate action in a vehicle when the vehicle is at or is approaching a location identified as having a user-reported potentially hazardous condition. This process uses a positioning system and map database in the vehicle to determine when the vehicle is at or is approaching such a location. The process may also take into account dynamic information. Dynamic information may include current traffic and weather conditions, ambient light conditions, road conditions (e.g., ice), and so on. The vehicle may include systems to obtain such information. For example, the vehicle may have a traffic data receiver that obtains real-time traffic information, e.g., RDS-TMC messages. The process 400 may use the dynamic information in combination with the precautionary action data. For example, the process may modify the location at which a warning is provided. As an example, if weather conditions indicate that it is raining, the location at which a warning is provided to the vehicle driver about a user-reported hazardous condition may be modified, i.e., adjusted to a point farther in advance of the location of the condition, in order to give the vehicle operator additional time or distance. The process may even take certain actions only under certain conditions. For example, a warning about a user-reported hazardous condition may be provided only during nighttime hours. During daylight, the condition may not warrant a warning.

Verification

The process (100 in FIG. 2) was described as a way to automatically examine records in a database that represents roads to identify locations or conditions along the road network where a precautionary action might be taken. According to the described process, data is then added to indicate the location where the precautionary action should be taken. Alternatively, instead of automatically adding the precautionary action data to the database, the locations where such conditions are identified could be marked on a temporary basis. Then, a geographic analyst (or other human operator) could review some or all such temporarily marked locations. The analyst may conduct this review by physically traveling to the locations or by reviewing satellite or aerial photographs of the locations, or video taken while driving by the locations (previously or subsequently acquired either by the analyst or others including members of the public). Based on the review, the analyst then determines whether precautionary action data should be added to the database.

It is intended that the foregoing detailed description be regarded as illustrative rather than limiting and that it is understood that the following claims including all equivalents are intended to define the scope of the invention.

I claim:

1. A method for making a database that represents a road network in a geographic region, the method comprising:
   receiving reports from users about hazardous conditions located along the road network;
   identifying reports that pertain to the same general location;
   grouping together clusters of reports that pertain to the same general location, wherein said clusters meet a threshold size determined to declare a location as potentially dangerous;
   using data contained in the database to confirm user-reported hazardous conditions located along roads throughout the geographic region; and
   adding precautionary action data to the database to indicate a location for which a precautionary action is to be taken by a vehicle system to address one of said hazardous conditions.

2. The method of claim 1 further wherein the hazardous condition is confirmed using data obtained from the database that represents the road network.

3. The method of claim 1 further comprising:
   using information in the reports to determine what data to obtain from the database.

4. The method of claim 1 further comprising:
   continuing to evaluate reports to identify all clusters of locations of user-reported hazardous conditions throughout the geographic region.

5. The method of claim 1 further comprising:
   compiling the database into a format suitable for use in a navigation system.

6. The method of claim 1 wherein the step of using data contained in the database comprises evaluating at least two items of data contained in the database to determine whether a user-reported hazardous condition is located along a road.

7. A database stored on a non-transitory computer-readable medium, wherein the database includes data that represents a road network in a geographic region, wherein the database comprises:
   data records that represent road segments that make up the road network; and
   data that indicates precautionary action locations, wherein a precautionary action location is determined by identifying and grouping clusters of reports from users that pertain to a same general location, wherein said clusters meet a threshold size determined to declare a location as potentially dangerous, and then using data that represents features of the road network to confirm existence of features of the road network that result in the hazardous condition.

8. The database of claim 7 wherein the precautionary action data further includes data that indicates a location along a road segment at which a precautionary action is to be taken by a vehicle system.

9. The database of claim 7 wherein the precautionary action data further includes data that indicates a direction along a road segment at which a precautionary action is to be taken.

10. The database of claim 7 wherein the precautionary action data further includes data that refers to the location of the actual hazardous condition.

11. The database of claim 7 further comprising data that indicates permitted directions of travel along road segments, speed limits along road segments, classifications of road segments, and locations of road segments.

12. The database of claim 7 further comprising data that identifies successor road segments of each road segment, wherein successor road segments are those road segments that connect to a road segment at each end thereof.

13. A vehicle system comprising:
a database that contains data representing a geographic region in which a vehicle is being operated, wherein the data includes data that represents a road network located in the geographic region and precautionary action data that indicates precautionary action locations associated with locations where user-reported hazardous conditions are located along sections of roads, wherein a location of a user-reported hazardous condition is based on identifying clusters of reports from users that pertain to a same general location, wherein said clusters meet a threshold size determined to declare a location as potentially dangerous, and then using data that represents features of the road network to confirm existence of features of the road network that result in the hazardous condition;
a positioning system that determines a current location of the vehicle relative to the data representing a geographic region; and
a precautionary action application responsive to the positioning system and the database that provides a precautionary action when the positioning system determines that the current location of the vehicle is approaching a user-reported hazardous condition located along a road.

14. The system of claim 13 wherein the precautionary action data further includes data that indicates a location along a road segment at which a precautionary action is to be taken by a vehicle system.

15. The system of claim 13 wherein the precautionary action data further includes data that indicates a direction along a road segment at which a precautionary action is to be taken.

16. The system of claim 13 wherein the precautionary action data further includes data that refers to the location of the actual user-reported hazardous condition along the road.

17. A method for providing precautionary actions in a vehicle comprising:
determining a current position of the vehicle;
accessing a database that represents a road network to obtain data representations of a part of the road network around of the current position of the vehicle; and
upon determining that the data representations of the part of the road network around the current position of the vehicle include precautionary action data, wherein the precautionary action data is determined by identifying and grouping clusters of reports from users that pertain to a same general location, wherein said clusters meet a threshold size determined to declare a location as potentially dangerous, and then using data that represents features of the road network to confirm existence of features of the road network that result in the hazardous condition, taking a precautionary action as the vehicle is approaching a user-reported hazardous condition located along a section of road.

18. The method of claim 17 further comprising:
building an electronic horizon after accessing the database; and
using the electronic horizon to determine whether precautionary action data is included therein.

19. The method of claim 17 wherein the precautionary action is provided via a user interface of the vehicle.

* * * * *